US011109359B2

United States Patent
Yang et al.

(10) Patent No.: US 11,109,359 B2
(45) Date of Patent: *Aug. 31, 2021

(54) METHOD AND USER EQUIPMENT FOR TRANSMITTING UPLINK SIGNAL AND USER EQUIPMENT FOR RECEIVING UPLINK SIGNAL

(71) Applicant: LG ELECTRONICS INC., Seoul (KR)

(72) Inventors: Suckchel Yang, Seoul (KR); Joonkui Ahn, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,636

(22) Filed: Dec. 9, 2019

(65) Prior Publication Data
US 2020/0120641 A1 Apr. 16, 2020

Related U.S. Application Data

(63) Continuation of application No. 15/516,326, filed as application No. PCT/KR2015/010435 on Oct. 2, 2015, now Pat. No. 10,531,434.

(Continued)

(51) Int. Cl.
*H04W 72/04* (2009.01)
*H04W 74/08* (2009.01)
(Continued)

(52) U.S. Cl.
CPC ............ *H04W 72/04* (2013.01); *H04J 11/003* (2013.01); *H04L 5/001* (2013.01); *H04L 5/0037* (2013.01);
(Continued)

(58) Field of Classification Search
CPC .......................... H04W 74/0833; H04L 5/0037
See application file for complete search history.

(56) References Cited

U.S. PATENT DOCUMENTS 10,531,434 B2 * 1/2020 Yang ................. H04W 74/0833
2012/0088514 A1 4/2012 Lee et al.
(Continued)

FOREIGN PATENT DOCUMENTS

KR 10-0903870 B1 6/2009
WO WO 2012/177054 A2 12/2012

OTHER PUBLICATIONS

Huawei et al., "Uplink control channel design for MTC UEs," 3GPP TSG RAN WG1 Meeting #78bis, R1-143718, Ljubljana, Slovenia, Oct. 6-10, 2014, 3 pages.

(Continued)

*Primary Examiner* — Hoon J Chung
(74) *Attorney, Agent, or Firm* — Birch, Stewart, Kolasch & Birch LLP

(57) ABSTRACT

A user equipment operating in a coverage enhancement mode in a wireless communication system, includes a transceiver, at least one processor, and at least one computer memory that is operably connectable to the processor and that has stored thereon instructions which, when executed, cause the processor to perform operations comprising transmitting, via the transceiver, a random access preamble on a uplink system band; receiving, via the transceiver, a random access response related to the random access preamble; and transmitting, via the transceiver, a first physical uplink shared channel (PUSCH) for carrying Msg3 based on the random access response, wherein the uplink system band comprises a plurality of uplink frequency bands in a frequency domain, each of the plurality of uplink frequency bands includes only a predetermined number of consecutive (Continued)

resource blocks in the frequency domain, and the random access response includes frequency resource information for the first PUSCH.

15 Claims, 10 Drawing Sheets

Related U.S. Application Data

(60) Provisional application No. 62/058,684, filed on Oct. 2, 2014, provisional application No. 62/065,608, filed on Oct. 17, 2014.

(51) Int. Cl.
    *H04J 11/00*     (2006.01)
    *H04L 5/00*     (2006.01)
    *H04L 27/26*     (2006.01)
    *H04W 74/00*     (2009.01)

(52) U.S. Cl.
    CPC ....... *H04W 74/0833* (2013.01); *H04L 5/0053* (2013.01); *H04L 27/2602* (2013.01); *H04W 74/002* (2013.01); *H04W 74/006* (2013.01)

(56) References Cited

U.S. PATENT DOCUMENTS

| | | |
|---|---|---|
| 2013/0077582 A1 | 3/2013 | Kim et al. |
| 2013/0083749 A1 | 4/2013 | Xu et al. |
| 2013/0195041 A1 | 8/2013 | Papasakellariou et al. |
| 2013/0322363 A1 | 12/2013 | Chen et al. |
| 2014/0198746 A1 | 7/2014 | Ahn et al. |

OTHER PUBLICATIONS

Intel Corporation, "Discussion on data and control channel enhancement for eMTC," 3GPP TSG RAN WG1 Meeting #78bis, R1-143771, Ljubljana, Slovenia, Oct. 6-10, 2014, pp. 1-6.

\* cited by examiner

PUCCH format 1a and 1b structure (normal CP case)

METHOD AND USER EQUIPMENT FOR TRANSMITTING UPLINK SIGNAL AND USER EQUIPMENT FOR RECEIVING UPLINK SIGNAL

CROSS REFERENCE TO RELATED APPLICATIONS

This application is a Continuation of U.S. application Ser. No. 15/516,326, filed on Mar. 31, 2017 (now U.S. Pat. No. 10,531,434 issued on Jan. 7, 2020), which is the National Phase of PCT International Application No. PCT/KR2015/010435, filed on Oct. 2, 2015, which claims priority under 35 U.S.C. 119(e) to U.S. Provisional Application No. 62/058,684, filed on Oct. 2, 2014 and U.S. Provisional Application No. 62/065,608, filed on Oct. 17, 2014, all of these applications are hereby expressly incorporated by reference into the present application

BACKGROUND OF THE INVENTION

Technical Field

The present invention relates to a wireless communication system and, more particularly, to a method for receiving or transmitting downlink signal and an apparatus therefor.

Background Art

Wireless communication systems have been widely deployed to provide various types of communication services such as voice or data. In general, a wireless communication system is a multiple access system that supports communication with multiple users by sharing available system resources (bandwidth, transmission power, etc.). For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. WiMAX may be described based on the IEEE an 802.16e standard (WirelessMAN-OFDMA reference system) and the evolved IEEE 802.16m standard (WirelessMAN-OFDMA advanced system).

Recently, in a communication technology standardization institute (e.g. 3GPP, IEEE, etc.) that establishes a next-generation communication technology standard (e.g. beyond LTE-A), a machine type communication (MTC) has emerged as one important standardization issue. MTC refers to information exchange between a machine and a base station, performed without human intervention.

SUMMARY OF THE INVENTION

A communications service provided through MTC is different from a legacy communication service involving human interaction and, therefore, it is necessary to define a new communication method suitable for MTC.

The technical objects that can be achieved through the present invention are not limited to what has been particularly described hereinabove and other technical objects not described herein will be more clearly understood by persons skilled in the art from the following detailed description.

To solve the above technical problems, a user equipment (UE) configured to operate within a specific band that is preconfigured to be narrower than an entire system band and a base station (BS) that supports the UE are provided.

In an aspect of the present invention, provided herein is a method of transmitting an uplink signal by a user equipment (UE). The method comprises: configuring an uplink operation frequency band for the UE from out of an entire uplink system band; and transmitting an uplink control channel in the uplink operation frequency band. The uplink operation frequency band may include 6 resource blocks in a frequency domain. The uplink control channel may be transmitted using the lowest frequency resource block and the highest frequency resource block among the 6 resource blocks within the uplink operation frequency band.

In another aspect of the present invention, provided herein is a user equipment (UE) for transmitting an uplink signal UE. The UE comprises a radio frequency (RF) unit and a processor configured to control the RF unit. The processor may be configured to: configure an uplink operation frequency band for the UE from out of an entire uplink system band; and control the RF unit to transmit an uplink control channel in the uplink operation frequency band. The uplink operation frequency band may include 6 resource blocks in a frequency domain. The uplink control channel may be transmitted using the lowest frequency resource block and the highest frequency resource block among the 6 resource blocks within the uplink operation frequency band.

In another aspect of the present invention, provided herein is a method of receiving an uplink signal by a base station (BS). The method comprises: allocating an uplink operation frequency band for a user equipment (UE) from out of an entire uplink system band; and receiving an uplink control channel in the uplink operation frequency band from the UE. The uplink operation frequency band may include 6 resource blocks in a frequency domain. The uplink control channel may be received using the lowest frequency resource block and the highest frequency resource block among the 6 resource blocks within the uplink operation frequency band.

In another aspect of the present invention, provided herein is a base station (BS) for receiving an uplink signal. The BS comprises a radio frequency (RF) unit, and a processor configured to control the RF unit. The processor may be configured to: allocate an uplink operation frequency band for a user equipment (UE) from out of an entire uplink system band; and control the RF unit to receive an uplink control channel in the uplink operation frequency band from the UE. The uplink operation frequency band may include 6 resource blocks in a frequency domain. The uplink control channel may be received using the lowest frequency resource block and the highest frequency resource block among the 6 resource blocks within the uplink operation frequency band.

In each aspect of the present invention, an uplink data channel may be transmitted or received in 4 middle resource blocks among the 6 resource blocks within the uplink operation frequency band.

In each aspect of the present invention, the uplink control channel may be transmitted or received in symbols except for the last symbol of a subframe if the subframe is a sounding reference signal (SRS) subframe configured for transmission of an SRS.

In each aspect of the present invention, a random access preamble may be transmitted/received and a random access response to the random access preamble may be received/transmitted. The random access response may include allocation information of the uplink operation frequency band. The uplink operation frequency band may be configured based on the allocation information.

The above technical solutions are merely some parts of the embodiments of the present invention and various embodiments into which the technical features of the present invention are incorporated can be derived and understood by persons skilled in the art from the following detailed description of the present invention.

According to the present invention, radio communication signals can be efficiently transmitted/received. Therefore, overall throughput of a wireless communication system is improved.

According to an embodiment of the present invention, a low-price/low-cost UE can communicate with a BS while maintaining compatibility with a legacy system.

According to an embodiment of the present invention, a UE can be implemented with low price/low cost.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention, illustrate embodiments of the invention and together with the description serve to explain the principle of the invention.

DETAILED DESCRIPTION OF THE EMBODIMENTS

Figure 1:
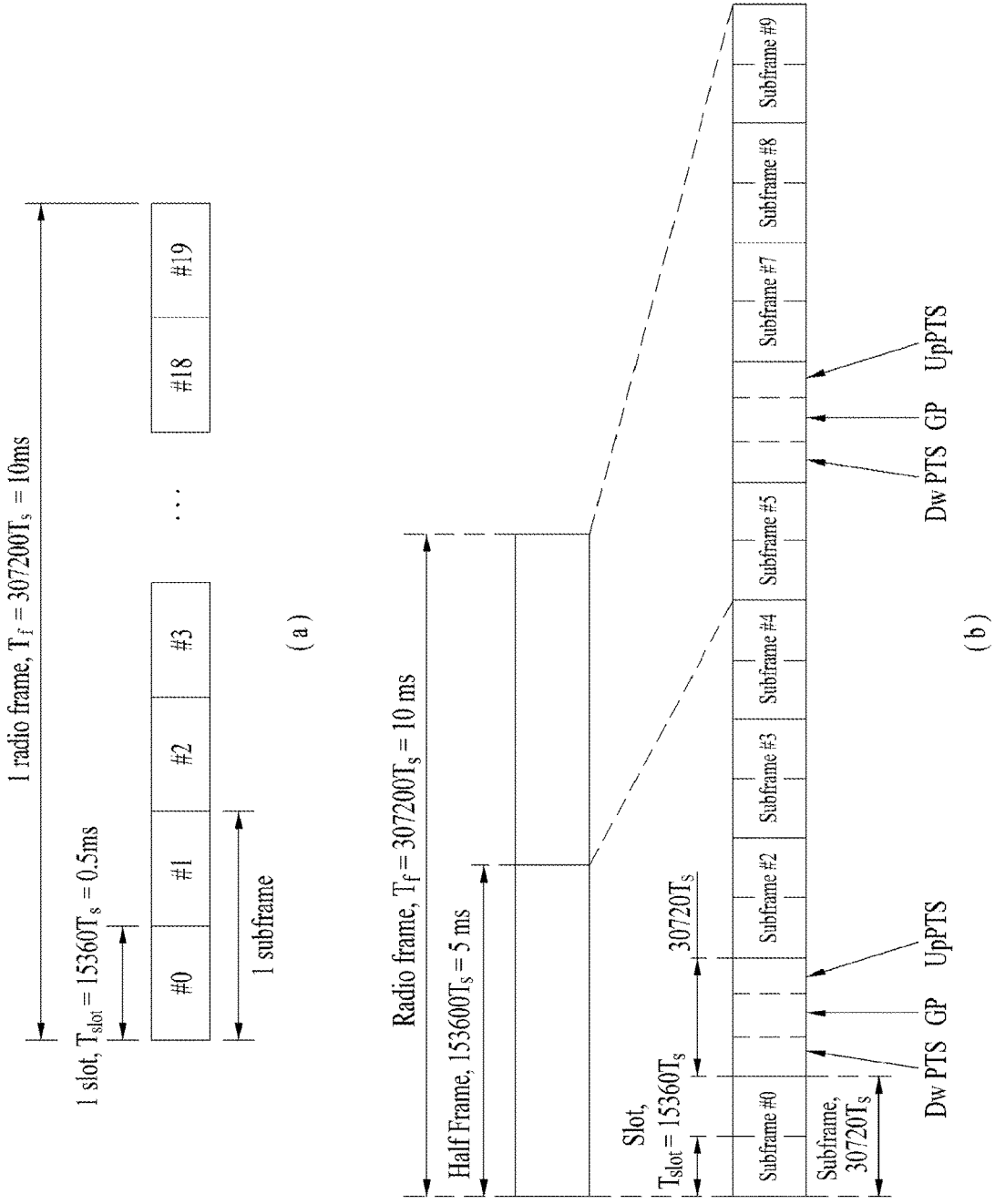
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (HACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to as a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15kHz)$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms  | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$  | 2192 · $T_s$ | 2560 · $T_s$ | 7680 · $T_s$  | 2192 · $T_s$ | 2560 · $T_s$ |
| 1 | 19760 · $T_s$ |              |              | 20480 · $T_s$ |              |              |
| 2 | 21952 · $T_s$ |              |              | 23040 · $T_s$ |              |              |
| 3 | 24144 · $T_s$ |              |              | 25600 · $T_s$ |              |              |
| 4 | 26336 · $T_s$ |              |              | 7680 · $T_s$  | 4384 · $T_s$ | 5120 · $T_s$ |
| 5 | 6592 · $T_s$  | 4384 · $T_s$ | 5120 · $T_s$ | 20480 · $T_s$ |              |              |
| 6 | 19760 · $T_s$ |              |              | 23040 · $T_s$ |              |              |
| 7 | 21952 · $T_s$ |              |              | —             | —            | —            |
| 8 | 24144 · $T_s$ |              |              | —             | —            | —            |

Figure 2:
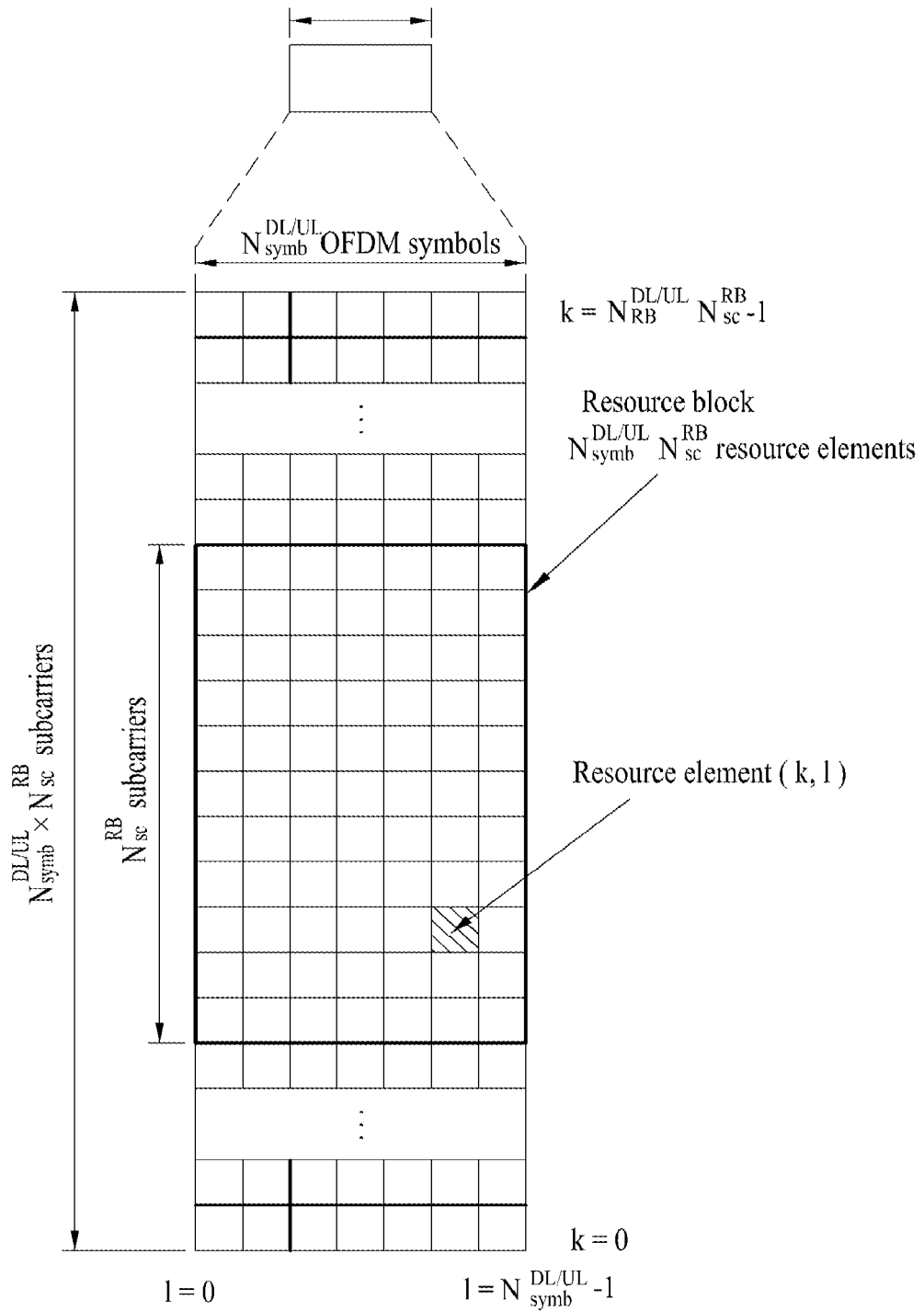
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency fc.

One RB is defined as $N^{DU/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DU/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DU/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DU/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

The relationship between the PRB $n_{PRB}$ and the RE (k, l) in a slot may be defined by $n_{PRB}=floor(k/N^{RB}sc)$.

Herein, k denotes a subcarrier index and $N^{RB}_{sc}$ denotes the number of subcarriers included in one RB.

The VRB is a logical resource allocation unit introduced for resource allocation. The VRB is equal in size to the PRB. The VRB is classified into a localized-type VRB and a distributed-type VRB according to a scheme of mapping the VRB to the PRB. The localized-type VRB is directly mapped to the PRB so that a VRB number (or VRB index) corresponds directly to a PRB number. That is, $n_{PRB}=n_{VRB}$. The localized VRBs are numbered from 0 to $N^{DL}_{VRB}-1$ and $N^{DL}_{VRB}=N^{DL}_{RB}$. Hence, according to a localized mapping scheme, a VRB having the same VRB number is mapped to a PRB having the same PRB number in the first slot and the second slot. In contrast, the distributed-type VRB is mapped to the PRB after interleaving. Accordingly, a distributed-type VRB having the same VRB number may be mapped to a PRB having a different PRB number in the first slot and the second slot. Two PRBs having the same VRB number, located, one by one, in two slots of a subframe, are referred to as a VRB pair. The PRB pair and the VRB pair may be collectively referred to as an RB pair. An RB for a UE or a UE group is allocated based on a VRB. In principle, VRBs having the same VRB number are allocated to the same UE or UE groups. Mapping of the localized-type VRB to the PRB may be referred to as localized mapping and mapping of the distributed-type VRB to the PRB may be referred to as distributed mapping.

Figure 3:
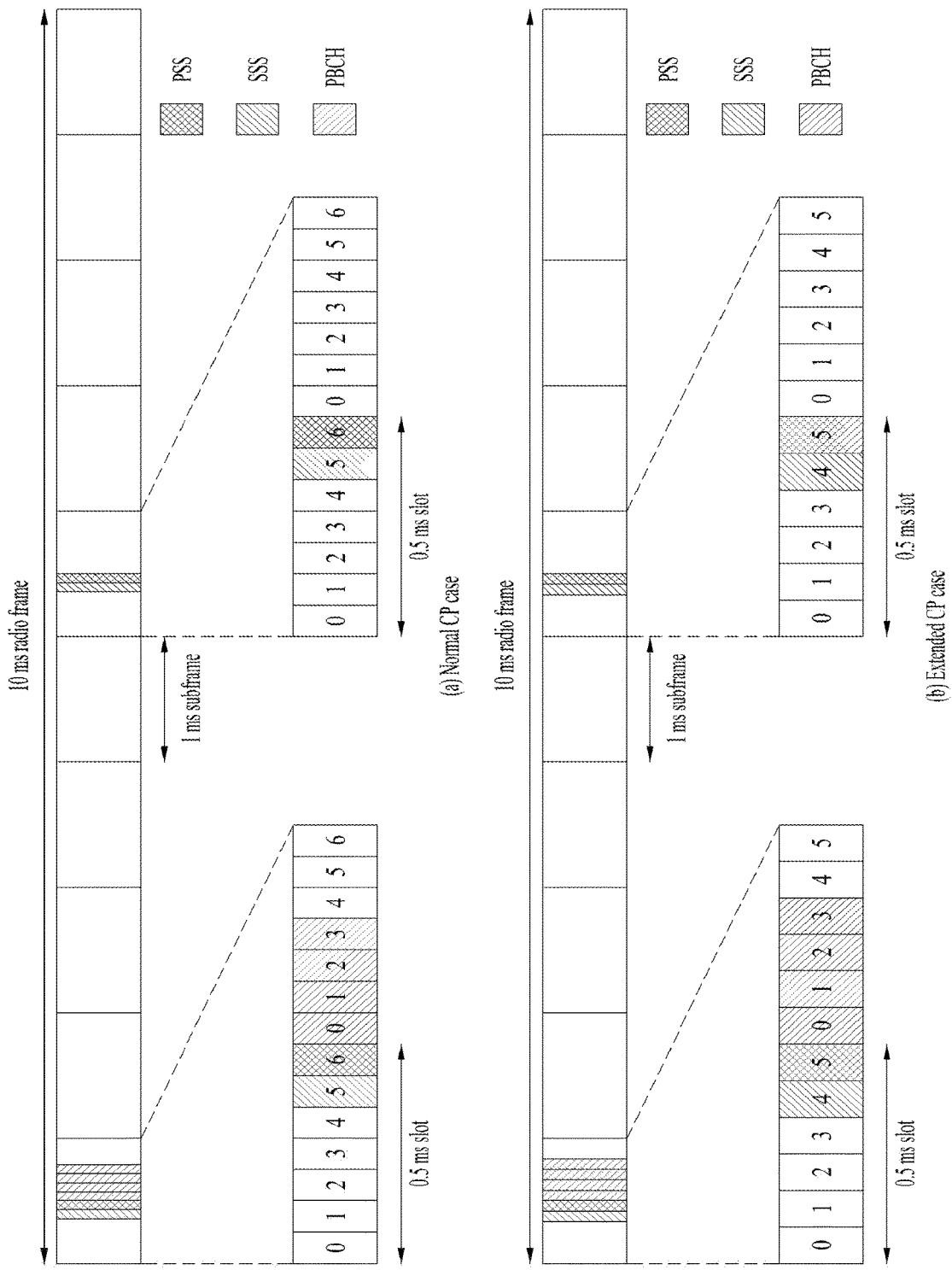
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The PBCH is mapped to four subframes during 40 ms. The time of 40 ms is blind-detected and explicit signaling about 40 ms is not separately present. In the time domain, the PBCH is transmitted on OFDM symbols 0 to 3 of slot 1 in subframe 0 (the second slot of subframe 0) of a radio frame.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

A DL carrier frequency and corresponding system BW may be acquired by the PBCH and a UL carrier frequency and corresponding system BW may be obtained through system information which is a DL signal. For example, the UE may acquire SIB2, to thereby discern an entire UL system band that the UE can use for UL transmission through a UL carrier frequency and UL BW information in SIB2.

The UE having finished initial cell search may perform the random access procedure to complete access to the eNB. To this end, the UE may transmit a preamble through a physical random access channel (PRACH), and receive a response message which is a response to the preamble through a PDCCH and PDSCH. In the case of contention-based random access, transmission of an additional PRACH and a contention resolution procedure for the PDCCH and a PDSCH corresponding to the PDCCH may be performed.

After performing the procedure described above, the UE may perform PDCCH/PDSCH reception and PUSCH/PUCCH transmission as a typical procedure of transmission of an uplink/downlink signal.

The random access procedure is also referred to as a random access channel (RACH) procedure. The random access procedure is used for various purposes including initial access, adjustment of uplink synchronization, resource assignment, and handover. Random access procedures are classified into a contention-based procedure and a dedicated (i.e., non-contention-based) procedure. The contention-based random access procedure is used for general operations including initial access, while the dedicated random access procedure is used for limited operations such as handover. In the contention-based random access procedure, the UE randomly selects a RACH preamble sequence. Accordingly, it is possible that multiple UEs transmit the same RACH preamble sequence at the same time. Thereby, a contention resolution procedure needs to be subsequently performed. On the other hand, in the dedicated random access procedure, the UE uses an RACH preamble sequence that the eNB uniquely allocates to the UE. Accordingly, the random access procedure may be performed without contention with other UEs.

The contention-based random access procedure includes the following four steps. Messages transmitted in Steps 1 to 4 given below may be referred to as Msg1 to Msg4.

Step 1: RACH preamble (via PRACH) (from UE to eNB)
Step 2: Random access response (RAR) (via PDCCH and PDSCH) (from eNB to UE)
Step 3: Layer 2/layer 3 message (via PUSCH) (from UE to eNB)
Step 4: Contention resolution message (from eNB to UE)

The dedicated random access procedure includes the following three steps. Messages transmitted in Steps 0 to 2 may be referred to as Msg0 to Msg2, respectively. Uplink transmission (i.e., Step 3) corresponding to the RAR may also be performed as a part of the random access procedure. The dedicated random access procedure may be triggered using a PDCCH for ordering transmission of an RACH preamble (hereinafter, a PDCCH order).

Step 0: RACH preamble assignment (from eNB to UE) through dedicated signaling
Step 1: RACH preamble (via PRACH) (from UE to eNB)
Step 2: RAR (via PDCCH and PDSCH) (from eNB to UE)

After transmitting the RACH preamble, the UE attempts to receive a random access response (RAR) within a preset time window. Specifically, the UE attempts to detect a PDCCH with RA-RNTI (Random Access RNTI) (hereinafter, RA-RNTI PDCCH) (e.g., CRC is masked with RA-RNTI on the PDCCH) in the time window. In detecting the RA-RNTI PDCCH, the UE checks the PDSCH for presence of an RAR directed thereto. The RAR includes timing advance (TA) information indicating timing offset information for UL synchronization, UL resource allocation information (UL grant information), and a random UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

Figure 4:
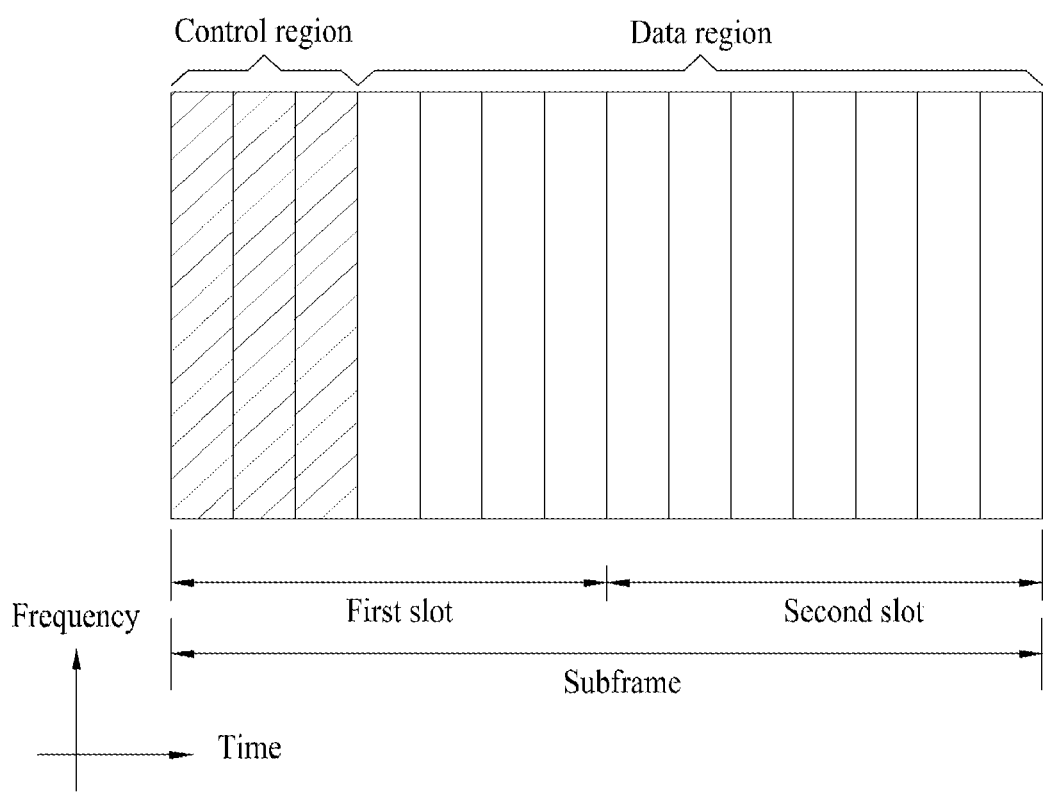
FIG. 4 illustrates the structure of a DL subframe used in a wireless communication system.

FIG. 4 illustrates the structure of a DL subframe used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

Figure 5:
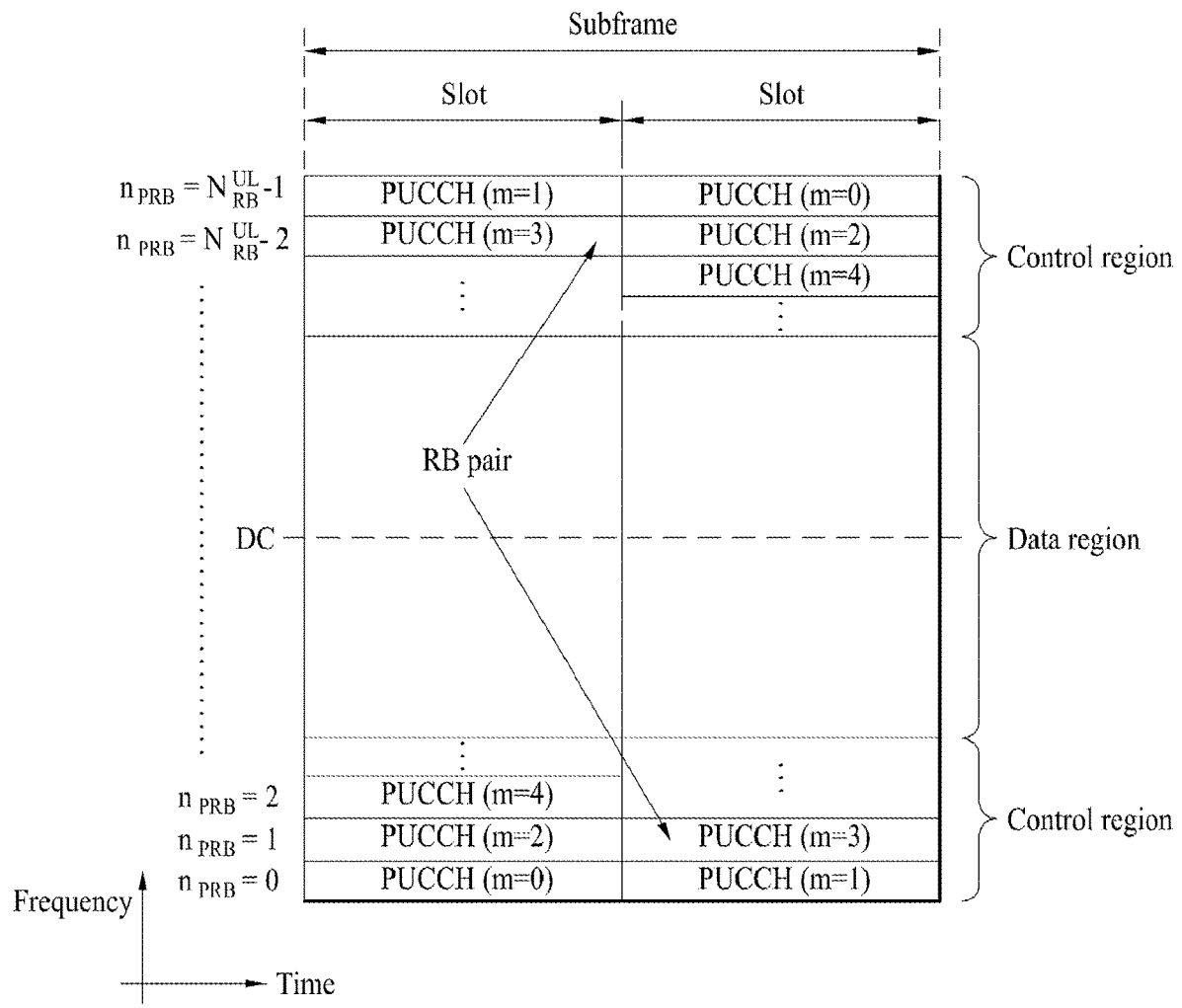
FIG. 5 illustrates the structure of a UL subframe used in a wireless communication system.

FIG. 5 illustrates the structure of a UL subframe used in a wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE generally when an eNB uses the PMI.

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of a PUCCH and a PUSCH may be indicated by higher layers.

In principle, the UCI is transmitted using the PUCCH. The amount of the UCI that the UE can transmit in a subframe depends on the number of SC-FDMA symbols available for UCI transmission. The SC-FDMA symbols available for UCI transmission indicate remaining SC-FDMA symbols except for SC-FDMA symbols for RS transmission in a subframe and, in a subframe in which an SRS is configured, the last SC-FDMA symbol of the subframe is also excluded from the SC-FDMA symbols available for UCI transmission. An RS is used for coherent detection of the PUCCH. The PUCCH supports various formats according to transmitted information.

Table 3 shows the mapping relationship between a PUCCH format and UCI in an LTE/LTE-A system.

TABLE 3

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH format 1 series and PUCCH format 3 series are mainly used to transmit ACK/NACK information and PUCCH format 2 series is mainly used to carry channel state information (CSI) such as channel quality indicator (CQI)/precoding matrix indicator (PMI)/rank indicator (RI).

Physical resources used for a PUCCH depend on two parameters, $N^{(2)}_{RB}$ and $N^{(1)}_{CS}$, given by higher layers. The parameter $N^{(2)}_{RB}$, which is equal to or greater than 0 ($N^{(2)}_{RB} \geq 0$), indicates available bandwidth for PUCCH format 2/2a/2b transmission at each slot and is expressed as an integer multiple of $N^{RB}_{SC}$. The parameter $N^{(1)}_{CS}$ indicates the number of cyclic shifts used for PUCCH format 1/1a/1b in an RB used for a mix of formats 1/1a/1b and 2/2a/2b. A value of $N^{(1)}_{CS}$ is an integer multiple of $\Delta^{PUCCH}_{shift}$ within a range of $\{0, 1, \ldots, 7\}$. $\Delta^{PUCCH}_{shift}$ is provided by higher layers. If $N^{(1)}_{CS}$ is 0, no mixed RB is present. At each slot, at most one RB supports a mix of PUCCH format 1/1a/1b and PUCCH format 2/2a/2b. Resources used for transmission of PUCCH format 1/1a/1b, PUCCH format 2/2a/2b, and PUCCH format 3 by an antenna port p are expressed by $n^{(1,\tilde{p})}_{PUCCH}$, $n^{(2,\tilde{p})}_{PUCCH} < N^{(2)}_{RB} * N^{RB}_{sc} + \text{ceil}(N^{(1)}_{cs}/8) * (N^{RB}_{sc} - N^{(1)}_{cs} - 2)$, and $n^{(3,\tilde{p})}_{PUCCH}$, respectively, which are indexes of non-negative integers.

PUCCH resources for UCI transmission are allocated to the UE by the eNB according to an explicit scheme based on a higher layer signal or an implicit scheme based on a dynamic control signal.

PUCCH resources of a cell may be configured based on a cell ID (e.g. a physical cell ID $N^{cell}_{ID}$ or a virtual cell ID configured by a higher layer). The UE acquires the physical cell ID $N^{cell}_{ID}$ based on a PSS and an SSS of the cell and configures the PUCCH resources for PUCCH transmission on the cell, i.e. for PUCCH transmission to a point of the cell, based on the acquired physical cell ID $N^{cell}_{ID}$. The PUCCH resources configured on one CC based on the physical cell ID $N^{cell}_{ID}$ include PUCCH resources for CSI transmission, PUCCH resources for semi-persistent scheduling (SPS) ACK/NACK and SR transmission, and PUCCH resources for dynamic ACK/NACK transmission (i.e. PUCCH resources dynamically allocated in linkage with a PDCCH). In a 3GPP LTE/LTE-A system, the PUCCH resources for CSI, SPS ACK/NACK, and SR transmission are semi-statically reserved by a higher layer signal in an explicit manner. Hereinafter, for ACK/NACK transmission, the PUCCH resources dynamically determined in linkage with the PDCCH will be especially referred to as dynamic PUCCH resources or implicit PUCCH resources, and PUCCH resources explicitly configured by a higher layer signal will be especially referred to as semi-static PUCCH resources or explicit PUCCH resources.

The PUCCH resources based on one cell ID are arranged in order of CSI PUCCH resources, SPS ACK/NACK and SR PUCCH resources, and dynamic ACK/NACK PUCCH resources, starting from subcarriers distant from a direct current (DC) subcarrier (i.e. a subcarrier mapped to $f_0$ in a frequency up-conversion process) in the direction of the DC subcarrier. In other words, the PUCCH resources configured semi-statically by higher layer signaling are located at the outer side of UL transmission bandwidth and the ACK/NACK PUCCH resources configured dynamically are located nearer a center frequency than the semi-statically configured PUCCH resources. As a PUCCH resource is located nearer the center frequency, an index of the PUCCH resource increases. In other words, an index of a PUCCH resource allocated to a PRB near the center frequency is greater than an index of a PUCCH resource allocated to a PRB distant from the center frequency. Multiple PUCCH resources in the same PRB are indexed based on orthogonal sequences and/or cyclic shifts.

Figure 6:
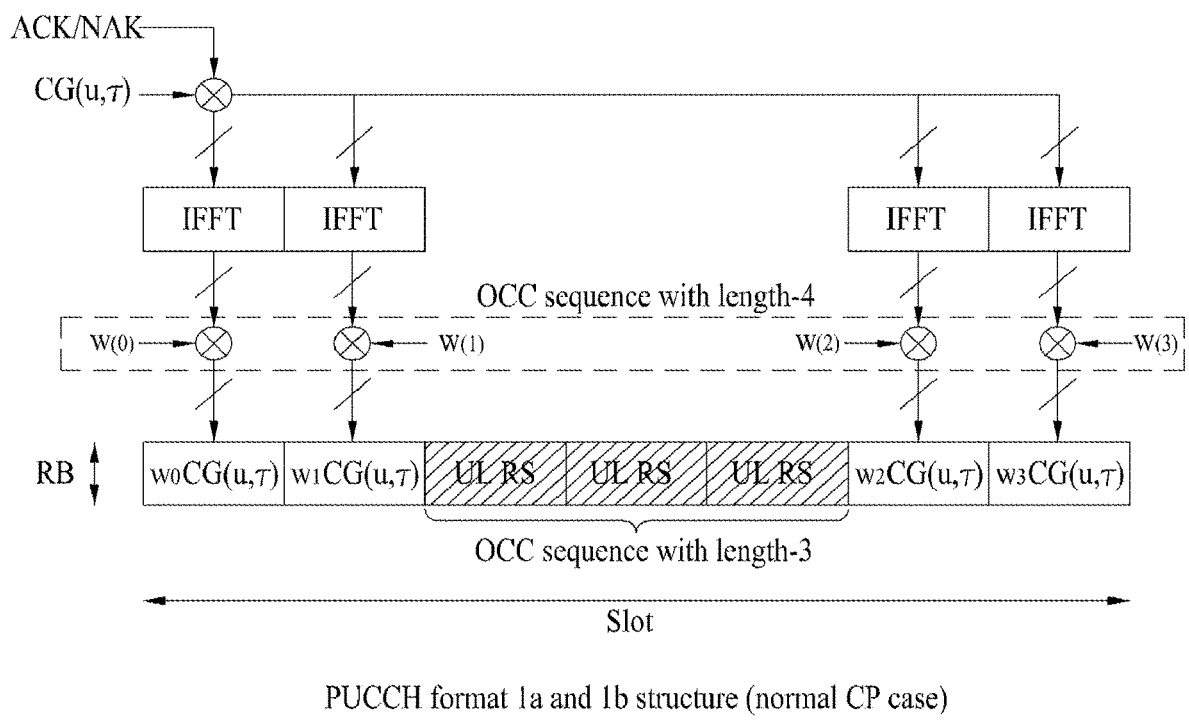
FIG. 6 illustrates the structures of PUCCH formats 1a and 1b for a normal CP among PUCCH formats.

A PUCCH differs in structure according to PUCCH format and CP length. To aid in understanding a PUCCH format, reference is made to FIG. 6. FIG. 6 illustrates the structures of PUCCH formats 1a and 1b for a normal CP among PUCCH formats. FIG. 6 illustrates a PUCCH structure in one slot in a subframe and (not in the case of a shortened PUCCH) a structure similar to the PUCCH structure is also used in another slot. In an SRS subframe in which the last symbol of a subframe is used for SRS transmission, the shortened PUCCH is used. In the shortened PUCCH, a PUCCH structure having the same length as the number of symbols in a slot is used in the first slot of a subframe and a PUCCH structure having a form in which the last symbol appears to be omitted is used in the second slot of the subframe. A PUCCH format part in the first slot in a subframe and a PUCCH format part in the second slot in the subframe constitute one PUCCH format. In a PUCCH of a PUCCH format 1 series, control information of the same content is repeated on a slot basis in a subframe. In a PUCCH of a PUCCH format 2 series, UCI is coded using a block code and then the coded UCI is mapped to two slots.

In each UE, the ACK/NACK signal may be transmitted through different resources that are comprised of different cyclic shifts (i.e., different frequency domain codes) of a Computer-Generated Constant Amplitude Zero Auto Correlation (CG-CAZAC) sequence and different resources composed of orthogonal cover or orthogonal cover code (OC or OCC). For example, OC may include a Walsh/DFT orthogonal code. Provided that the number of cyclic shifts (CSs) is 6 and the number of OCs is 3, a total of 18 UEs may be multiplexed in the same PRB on the basis of one antenna. Orthogonal sequences (w0, w1, w2, w3) may be applied to either an arbitrary time domain (after FFT modulation) or an arbitrary frequency domain (before FFT modulation). If the number of CSs is 6 and the number of OCs is 3, a total of 18 UEs may be multiplexed in the same PRB based on a single antenna. In other words, PUCCH resources used for ACK/NACK signal transmission may be distinguished by an OCC, a CS (or a CAZAC CS (CCS)), and a PRB. If any one of the OCC, CS, and PRB of PUCCH resources differs, the PUCCH resources may be considered as different resources.

PUCCH resources for ACK/NACK are not pre-allocated to each UE and a plurality of UEs in a cell dividedly uses a plurality of PUCCH resources at each time point. Specifically, PUCCH resources used by the UE to carry ACK/NACK are dynamically determined based on a PDCCH carrying scheduling information for a PDSCH carrying corresponding DL data.

The UE transmits ACK/NACK through PUCCH resources linked to a specific CCE (e.g. first CCE) among CCEs constituting a PDCCH received thereby.

For example, PUCCH resource indexes for transmission through two antenna ports ($p_0$ and $p_1$) in the 3GPP LTE/LTE-A system are determined as follows.

$$n^{(1,p=p_0)}_{PUCCH} = n_{CCE} + N^{(1)}_{PUCCH} \qquad \text{Equation 1}$$

$$n^{(1,p=p_1)}_{PUCCH} = n_{CCE} + 1 + N^{(1)}_{PUCCH} \qquad \text{Equation 2}$$

Here, $n^{(1,p=p_0)}_{PUCCH}$ denotes a PUCCH resource index (i.e. number) to be used by antenna port $p_0$, $n^{(1,p=p_1)}_{PUCCH}$ denotes a PUCCH resource index to be used by antenna port $p_1$, and $N^{(1)}_{PUCCH}$ denotes a signaling value received from higher layer. $N^{(1)}_{PUCCH}$ corresponds to a location at which a dynamic PUCCH resource is started among PUCCH resources of a cell. $n_{CCE}$ is the lowest of CCE indexes used for PDCCH transmission.

A sounding reference signal (SRS) may be transmitted in a UL subframe. In the UL subframe configured for SRS transmission, the SRS is transmitted on an SC-FDMA symbol located last on the time axis. SRSs of multiple UEs, transmitted on the last SC-FDMA symbol of the same subframe may be distinguished according to a frequency location/sequence.

Reference signal sequence $r^{(\alpha)}_{u,v}(n)$ is defined by a cyclic shift $\alpha$ of a basis sequence $\bar{r}_{u,v}(n)$ according to following equation.

$$r^{(\alpha)}_{u,v}(n) = e^{j\alpha n} \bar{r}_{u,v}(n), \ 0 \le n < M^{RS}_{sc} \qquad \text{Equation 3}$$

where $M^{RS}_{sc}=mN^{RB}_{sc}$ is the length of the reference signal sequence and $1 \le m \le N^{max,UL}_{RB}$. Multiple reference signal sequences are defined from a single base sequence through different values of α. Base sequences $\bar{r}_{u,v}(n)$ are divided into groups, where $u \in \{0,1,\ldots,29\}$ is the group number and v is the base sequence number within the group, such that each group contains one base sequence (v=0) of each length $M^{RS}_{sc}=mN^{RB}_{sc}$, $1 \le m \le 5$ and two base sequences (v=0,1) of each length $M^{RS}_{sc}=mN^{RB}_{sc}$, $6 \le m \le N^{max,UL}_{RB}$. The sequence group number v and the number v within the group may vary in time. The definition of the base sequence $\bar{r}_{u,v}(0), \ldots, \bar{r}_{u,v}(M^{RS}_{sc}-1)$ depends on the sequence length $M^{RS}_{sc}$.

The SRS sequence $r_{SRS}^{(\tilde{p})}(n)=r_{u,v}^{(\alpha_{\tilde{p}})}(n)$ is defined by a base sequence, where u is the sequence-group number and v is the base sequence number. In other words, an SRS is configured by a CAZAC sequence and SRSs transmitted by multiple UEs are CAZAC sequences $_{SRS}^{(\tilde{p})}(n)=r_{u,v}^{(\alpha_{\tilde{p}})}(n)$ having different CS values $\alpha_{\tilde{p}}$ according to the following equation.

$$\alpha_{\tilde{p}} = 2\pi \frac{n^{cs,\tilde{p}}_{SRS}}{8} \qquad \text{Equation 4}$$

$$n^{cs,\tilde{p}}_{SRS} = \left(n^{cs}_{SRS} + \frac{8\tilde{p}}{N_{ap}}\right) \bmod 8$$

$$\tilde{p} \in \{0, 1, \ldots, N_{ap}-1\}$$

where $n^{cs}_{SRS}=\{0,1,2,3,4,5,6,7\}$ is configured separately for periodic and each configuration of aperiodic sounding by the higher-layer parameters, respectively, for each UE and $N_{ap}$ is the number of antenna ports used for SRS transmission.

The SRS sequence is multipled with the amplitude scaling factor $\beta_{SRS}$ in order to conform to the transmit power $P_{SRS}$ specified according to the power determination rule, and mapped in sequence starting with $r_{SRS}^{(\tilde{p})}(0)$ to resource elements (k,l) on antenna port p according to the following equation.

$$a^{(p)}_{2k'+k_0^{(\tilde{p})},l} = \begin{cases} \frac{1}{\sqrt{N_{ap}}}\beta_{SRS}r_{SRS}^{(\tilde{p})}(k') & k' = 0, 1, \ldots, M^{RS}_{sc,b}-1 \\ 0 & \text{otherwise} \end{cases} \qquad \text{Equation 5}$$

where $N_{ap}$ is the number of antenna ports used for SRS transmission and the relation between the index $\tilde{p}$ and the antenna port p is given by the following table.

TABLE 4

| | | Antenna port p as a function of the number of antenna ports configured for SRS | | |
|---|---|---|---|---|
| | Index $\tilde{p}$ | 1 | 2 | 4 |
| SRS | 0 | 10 | 20 | 40 |
| | 1 | — | 21 | 41 |
| | 2 | — | — | 42 |
| | 3 | — | — | 43 |
| | 1 | — | 201 | — |

The set of antenna ports used for SRS transmission is configured independently for periodic and each configuration of aperiodic sounding. The quantity $k^{(p)}_0$ is the frequency-domain starting position of the sounding reference signal and for $b=B_{SRS}$ and $M^{RS}_{sc,b}$ is the length of the sounding reference signal sequence defined as the following equation.

$$M_{sc,b}^{RS}=m_{SRS,b}N_{sc}^{RB}/2 \qquad \text{Equation 6}$$

where $m_{SRS,b}$ is given for each UL bandwidth $N^{UL}_{RB}$. The following table shows values $m_{SRS}$ and $N_b$ (b=0, 1, 2, and 3) for UL bandwidths corresponding to $6 \le N^{UL}_{RB} \le 40$ among UL bandwidths $N^{UL}_{RB}$.

TABLE 5

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

The SRS bandwidth configuration $C_{SRS} \in \{0,1,2,3,4,5,6,7\}$, which is the cell-specific parameter, and SRS-Bandwidth $B_{SRS} \in \{0,1,2,3\}$ which is the UE-specific parameter, are given by higher layers. For UpPTS, $m_{SRS,0}$ is reconfigured to $m^{max}_{SRS,0}=\max_{c \in C}\{m^c_{SRS,0}\} \le (N^{UL}_{RB}-6N_{RA})$ if this reconfiguration is enabled by the cell-specific parameter given by higher layers, where c is a SRS BW configuration and $C_{SRS}$ is the set of SRS BW configurations from the tables defined for each UL BW, $N_{RA}$ is the number of format 4 PRACH in the addressed UpPTS and derived from a table (not shown) defined for the Frame structure type 2 random access preamble mapping in time and frequency.

The frequency-domain starting position $k^{(p)}_0$ is defined by the following equation.

$$k_0^{(p)} = \bar{k}_0^{(p)} + \sum_{b=0}^{B_{SRS}} 2M^{RS}_{sc,b}n_b \qquad \text{Equation 7}$$

where for normal uplink subframes $\bar{k}_0^{(p)}$ is defined by the following Equation.

$$\bar{k}_0^{(p)}=(\lfloor N_{RB}^{UL}/2 \rfloor - m_{SRS,0}/2)N_{SC}^{RB}+k_{TC}^{(p)} \qquad \text{Equation 8}$$

and $\bar{k}_0^{(p)}$ for UpPTS is defined by the following Equation.

$$\bar{k}_0^{(p)} = \begin{cases} (N_{RB}^{UL} - m_{SRS,0}^{max})N_{sc}^{RB} + k_{TC}^{(p)} & \text{if } ((n_f \bmod 2) \cdot (2 - N_{SP}) + n_{hf}) \bmod 2 = 0 \\ k_{TC}^{(p)} & \text{otherwise} \end{cases} \quad \text{Equation 9}$$

The quantity $k^{(p)}{}_{TC} \in \{0,1\}$ is defined by the following Equation.

$$k_{TC}^{(p)} = \begin{cases} 1 - \bar{k}_{TC} & \text{if } n_{SRS}^{cs} \in \{4, 5, 6, 7\} \text{ and } \tilde{p} \in \{1, 3\} \text{ and } N_{ap} = 4 \\ \bar{k}_{TC} & \text{otherwise} \end{cases} \quad \text{Equation 10}$$

where the relation between the index $\tilde{p}$ and the antenna port p is given by Table 4, $k^{(p)}{}_{TC} \in \{0,1\}$ is given by the UE-specific parameter for periodic and each configuration of aperiodic transmission, respectively, provided by higher layers for the UE, and $n_b$ is frequency position index. The variable $n_{hf}$ is equal to 0 for UpPTS in the first half frame and equal to 1 for UpPTS in the second half frame of a radio frame.

The frequency hopping of the SRS is configured by the parameter $b_{hop} \in \{0,1,2,3\}$, provided by higher-layer parameter. Frequency hopping is not supported for aperiodic transmission. If frequency hopping of the SRS is not enabled (i.e., $b_{hop} \geq B_{SRS}$), the frequency position index $n_b$ (remains constant (unless re-configured) and is defined by '$n_b = \{\text{ceil}(4n_{RRC}/m_{SRS,b})\} \bmod N_b$' where the parameter $n_{RRC}$ is given by higher-layer parameters for periodic and each configuration of aperiodic transmission, respectively. If frequency hopping of the SRS is enabled (i.e., $b_{hop} < B_{SRS}$), the frequency position indexes $n_b$ are defined by the following equation.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{Equation 11}$$

where $N_b$ is given by a table (e.g., Table 5) given for each UL bandwidth $N^{UL}{}_{RB}$. $F_b$ is given by the following equation.

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \lfloor n_{SRS}/\prod_{b'=b_{hop}}^{b-1} N_{b'} \rfloor & \text{if } N_b \text{ odd} \end{cases} \quad \text{Equation 12}$$

where $N_{b_{hop}} = 1$ regardless of the $N_b$ value on Table 5. $n_{SRS}$ is given according to the following equation.

$$n_{SRS} = \begin{cases} 2N_{SP}n_f + 2(N_{SP-1})\lfloor \frac{n_s}{10} \rfloor + \lfloor \frac{T_{offset}}{T_{offset\_max}} \rfloor, & \text{for } 2msSRS \text{ periodicity of frame structure type 2} \\ \lfloor (n_f \times 10 + \lfloor n_s/2 \rfloor)/T_{SRS} \rfloor, & \text{otherwise} \end{cases} \quad \text{Equation 13}$$

counts the number of UE-specific SRS transmissions, where $T_{SRS}$ is UE-specific periodicity of SRS transmission, $T_{offset}$ is SRS subframe offset and $T_{offset\_max}$ is the maximum value of $T_{offset}$ for a certain configuration of SRS subframe offset.

Figure 7:
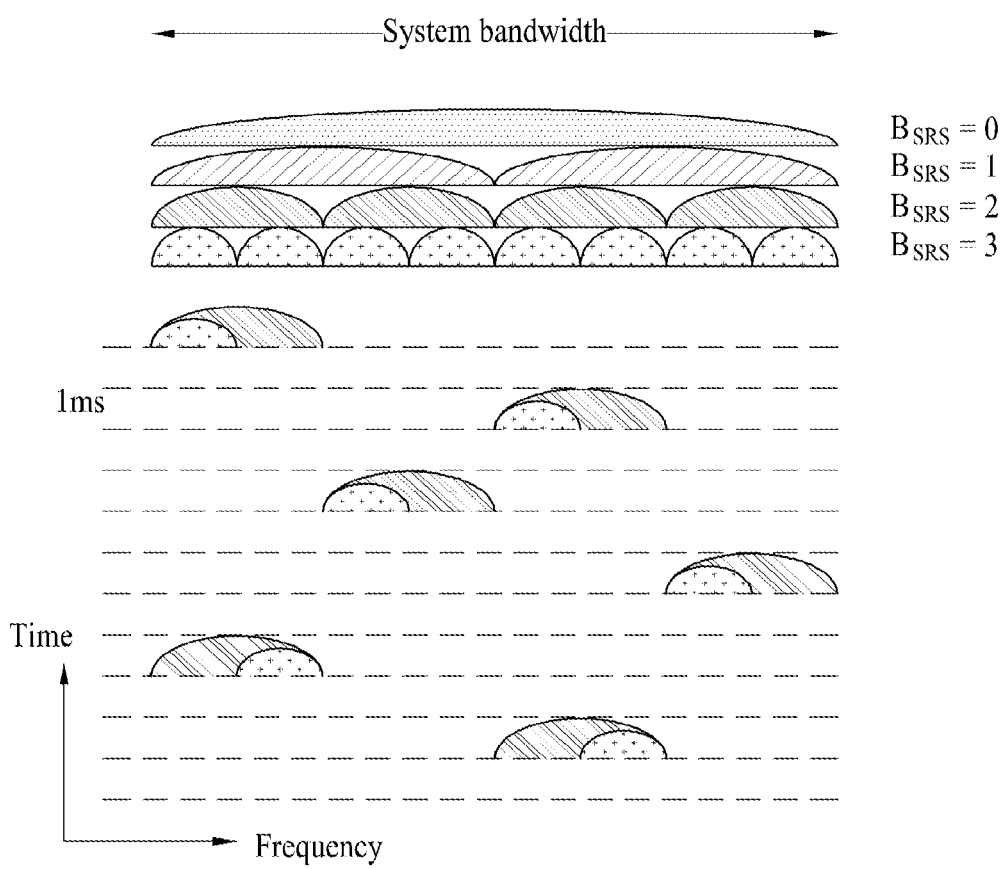
FIG. 7 illustrates a method of mapping an SRS to a certain UL system bandwidth.

FIG. 7 illustrates a method of mapping an SRS to a certain UL system bandwidth.

Referring to FIG. 7, in a UL system bandwidth, the UE performs frequency hopping at every SRS transmission timing and an SRS is transmitted on the last symbol of a subframe corresponding to an SRS transmission timing.

In a physical layer, the random access preamble consists of a cyclic prefix (CP) having a length of $T_{CP}$ and a sequence part having a length of $T_{SEQ}$. $T_{CP}$ and $T_{SEQ}$ depend on a frame structure and random access configuration and a higher layer controls a preamble format shown in the following table.

TABLE 6

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24516 \cdot T_s$ |
| 3 | $21024 \cdot T_s$ | $2 \cdot 24526 \cdot T_s$ |
| 4 | $448 \cdot T_s$ | $4096 \cdot T_s$ |
| (see NOTE) | | |

NOTE:
Frame structure type 2 and special subframe configuration with UpPTS lengths $4384 \cdot T_s$ and $5120 \cdot T_s$ only.

The random access preamble is transmitted in a UL subframe. The transmissions of random access preamble are restricted to certain time and frequency resources. These resources are referred to as PRACH resources. The PRACH resources are enumerated in order of increases of a subframe number in PRBs in a radio frame and the frequency domain so that index 0 may correspond to the lowest PRB and subframe in the radio frame. PRACH resources within the radio frame are indicated by a PRACH resource index.

For frame structure type 1 with preamble format 0-3, there is at most one random access resource per subframe. The following table shows preamble formats and subframes in which random access preamble transmission is permitted for a given configuration in frame structure type 1. A PRACH configuration index is given by a higher layer signal (transmitted by an eNB).

TABLE 7

| PRACH Configuration Index | Preamble Format | SFN | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |

TABLE 7-continued

| PRACH Configuration Index | Preamble Format | SFN | Subframe number |
|---|---|---|---|
| 60 | N/A | N/A | N/A |
| 61 | N/A | N/A | N/A |
| 62 | N/A | N/A | N/A |
| 63 | 3 | Even | 9 |

In Table 7, SFN denotes system frame number.

The first PRB $n^{RA}_{PRB}$ allocated to the PRACH opportunity considered for preamble formats 0, 1, 2 and 3 is defined as $n^{RA}_{PRB}=n^{RA}_{PRBoffset}$, where the PRACH frequency offset $n^{RA}_{PRBoffset}$ is expressed as a PRB configured by higher layers and fulfilling $0 \leq n^{RA}_{PRBoffset} \leq N^{UL}_{RB}-6$.

For frame structure type 2 with preamble formats 0-4, there might be multiple random access resources in an UL subframe (or UpPTS for preamble format 4) depending on the UL/DL configuration. Random access resources for frame structure type 2 are defined according to the PRACH configuration index (refer to the 3GPP TS 36.211 standard document).

Resource allocation for UL transmission is performed using a DL control channel having a UL DCI format. At present, resource allocation type 0 and resource allocation type 1 are supported for UL resource allocation. If the resource allocation type bit is not present in the uplink DCI format, only resource allocation type 0 is supported. If the resource allocation type bit is present in the uplink DCI format, the selected resource allocation type for a decoded downlink control channel is indicated by a resource allocation type bit. The UE interprets the resource allocation field depending on the resource allocation type bit in the downlink control channel.

The resource allocation information for UL resource allocation type 0 indicates to a scheduled UE a set of contiguously allocated virtual resource block indices denoted by $n_{VRB}$. A resource allocation field in the scheduling grant consists of a resource indication value (RIV) corresponding to a starting resource block ($RB_{START}$) and a length in terms of contiguously allocated resource blocks ($L_{CRBs} \geq 1$). The resource indication value is defined by the following equation.

$$\text{if } (L_{CRBs}-1) \leq \lfloor N^{UL}_{RB}/2 \rfloor \text{ then} \qquad \text{Equation 14}$$
$$RIV = N^{UL}_{RB}(L_{CRBs}-1) + RB_{START} \text{ else}$$
$$RIV = N^{UL}_{RB}(N^{UL}_{RB} - L_{CRBs}+1) + (N^{UL}_{RB}-1-RB_{START})$$

The resource allocation information for UL resource allocation type 1 indicates to a scheduled UE two sets of resource blocks with each set including one or more consecutive resource block groups of size P as given in the following table.

TABLE 8

| System Bandwidth $N^{DL}_{RB}$ | RBG size (P) |
|---|---|
| ≤10 | 1 |
| 11-26 | 2 |
| 27-63 | 3 |
| 64-110 | 4 | where $N^{UL}_{RB}$ is the number of RBs included in UL system bandwidth. A combinatorial index r consists of a number of bits according to the following equation.

$$\left\lceil \log_2\left(\binom{\lceil N^{UL}_{RB}/P + 1\rceil}{4}\right)\right\rceil \qquad \text{Equation 15}$$

The bits from the resource allocation field in the scheduling grant represent r unless the number of bits in the resource allocation field in the scheduling grant (i.e., UL DCI format) is:

1) smaller than required to fully represent r, in which case the bits in the resource allocation field in the scheduling grant occupy the least significant bits (LSBs) of r and the value of the remaining bits of r shall be assumed to be 0, or 2) larger than required to fully represent r, in which case r occupies the LSBs of the resource allocation field in the scheduling grant.

The combinatorial index r corresponds to a starting and ending RBG index of resource block set 1, $s_0$ and $s_1-1$, and resource block set 2, $s_2$ and $s_3-1$ respectively, where r is given by the following table with M=4 and N=ceil($N^{UL}_{RB}$/P)+1.

$$r = \sum_{i=0}^{M-1} \binom{N - s_i}{M - i} \qquad \text{Equation 16}$$

where the set $\{s_i\}_{i=0}^{M-1}$, ($1 \leq s_i \leq N$, $s_i < s_{i+1}$) contains the M sorted subband indices and $$\binom{x}{y} = \begin{cases} \binom{x}{y} & x \geq y \\ 0 & x < y \end{cases}$$

is the extended binomial coefficient, resulting in unique label $$r \in \left\{0, \ldots, \binom{N}{M} - 1\right\}.$$

Only a single RBG is allocated for a set at the starting RBG index if the corresponding ending RBG index equals the starting RBG index.

In a next-generation system beyond 3GPP LTE(-A) (beyond LTE-(A) system), a low-cost/low-specification UE based on data communication such as meter reading, water level measurement, use of a surveillance camera, and inventory reporting of a vending machine is considered. Hereinafter, such a UE is referred to as an MTC device or an MTC UE. Since less data is transmitted by the MTC UE and many MTC UEs operate in one cell, if signal transmission for UL/DL scheduling/feedback is performed for each MTC UE at every moment, eNB overhead remarkably increases. In particular, if transmissions of UL data/feedback performed by the MTC UE are intermittent and not persistent, an eNB cannot persistently maintain UL time/frequency synchronization of the MTC UE. Therefore, for power saving of the MTC UE, it is desirable to perform UL data/feedback transmission by the MTC UE according to a random access preamble based RACH procedure.

Meanwhile, a situation in which a plurality of MTC UEs that perform the same/similar functions in a coverage-limited space such as a specific building or warehouse are deployed/operated may be considered. Hereinafter, a plurality of MTC UEs that perform the same/similar functions in a coverage-limited space will be referred to as an MTC group. The MTC group may be implemented to intermittently transmit low volumes of data. Particularly, in the case of UL synchronization, since the MTC UEs are adjacent to each other in a coverage-limited space, there is a high probability that UEs that belong to the same MTC group have similar time/frequency synchronization.

Since an MTC UE is used to transmit less data and perform occasionally generated UL/DL data transmission/reception, it is efficient to lower the cost of the UE and reduce battery consumption according to the low data transmission rate. In addition, the MTC UE has low mobility and, therefore, a channel environment thereof rarely changes. Meanwhile, in consideration of up to a poor situation in which the MTC UE is installed in a coverage-limited place such as a basement as well as a building or a factory, various coverage enhancement schemes including a repetitive transmission method for the MTC UE with respect to each channel/signal have been discussed.

As technology for a low-cost/low-specification UE, decrease in the number of reception antennas, decrease in a maximum transport block (TB) size, reduction in the operating frequency bandwidth (BW) of the UE, and the like, may be considered. In particular, reduction of the operating BW of the UE may be implemented such that the MTC UE can perform a signal transmission/reception operation only with respect to a predetermined BW (e.g. 1.4 MHz or 6 RBs) narrower than an actual system BW (e.g. 20 MHz or 100 RBs) in terms of radio frequency (RF) and/or baseband (BB) signal processing.

Accordingly, even a UL channel/signal (e.g. a PRACH/PUSCH/PUCCH, and/or an SRS) may be configured to perform transmission by a UE only through a specific frequency band (hereinafter, MTC band) having a narrower BW (hereinafter, Bm) than an entire system BW (hereinafter, Bs) in the Bs. The present invention proposes a UL operation frequency band (MTC band) allocation and operation method for support and scheduling of a narrow BW based MTC UE.

(1) MTC Band Configuration Method

First UL transmission by an MTC UE may be PRACH preamble transmission in an initial access procedure. A frequency band in which PRACH transmission is to be performed may be configured by an SIB (e.g. SIB2). Next, an RAR, which is a reception response to PRACH transmission, may be received from an eNB and the MTC UE may perform transmission of Msg3 scheduled (e.g. resource-allocated) through the RAR. Thereafter, Msg4 may be received from the eNB for the purpose of contention resolution in a random access procedure. Next, RRC connection may be finally completed through a series of signal exchange, i.e. transmission/reception, procedures between the UE and the eNB.

Resource allocation (RA) for Msg3 transmission,

Alt 1) may be signaled based on the entire system band (i.e. BW corresponding to Bs) or Alt 2) may be signaled only with respect to a specific MTC band (i.e. BW corresponding to Bm).

In Alt 1, an MTC band may be designated as a band including all or some specific some resources (having BW of Bm) allocated for Msg3 transmission. In Alt 2, a corresponding specific MTC band may be designated as a band located at the middle (having BW of Bm) of the entire system band, may be configured as a band identical to a band in which PRACH transmission has been performed, or may be determined as a band linked to/configured on a PRACH transmission resource (in consideration of a scheme for configuring a corresponding MTC band per PRACH resource). When resource allocation for Msg3 transmission is signaled only with respect to the specific MTC band, the number of RBs, $N^{UL}_{RB,UE}$, in the specific MTC band may be used instead of the afore-described UL system BW $N^{UL}_{RB}$ in UL resource allocation type 1 and UL resource allocation type 2.

Alternatively, MTC band allocation information (e.g. a center frequency and/or a band start/end frequency (e.g. RB index)) may be directly signaled through the RAR. Based on the MTC band allocation information, Msg3 resource allocation in Alt 1 and/or Alt 2 may be performed.

As another method, an MTC band may be implicitly determined according to a temporary C-RNTI or C-RNTI in the form of a function of the RNTI. Based on the implicitly determined MTC band, Msg3 resource allocation in Alt 1 and/or Alt 2 may be performed. Alternatively, the MTC band allocation information may be explicitly signaled through Msg4 (independently of Msg3 transmission).

Meanwhile, an MTC UE may configure an MTC band (or the center band of system BW, a band in which PRACH transmission has been performed, or a band including an Msg3 resource) designated by the above schemes as a default MTC band until the MTC band is reconfigured through additional higher layer signaling (e.g. UE-specific RRC), thereby performing a UL channel/signal transmission and reception operation only through the corresponding frequency band.

In addition, an MTC band for DL reception (as well as the MTC band for UL transmission) may be configured based on the above proposed schemes. That is, the "MTC band" mentioned in the above-described embodiments of the present invention may include UL and/or DL. Meanwhile, the UL MTC band and the DL MTC band may be configured at different timings based on the above proposed scheme(s) or other schemes.

(2) MTC Band Allocation Method

The above narrow BW based MTC UE may operate to perform UL channel/signal (e.g. PUSCH, PUCCH, or SRS) transmission only in a given MTC band. The MTC band may have a narrow BW (hereinafter, Bm) corresponding to the number of RBs defined in a minimum system BW supportable in a current LTE system, i.e. 6 RBs. Meanwhile, the SRS has a structure transmitted based on frequency hopping in a preset cell-specific SRS band (in an entire system BW) with a predetermined periodicity as described above. The SRS may have a BW corresponding to a minimum of 4 RBs and it may be efficient to consider multiplexing transmission between an SRS of an MTC UE and an SRS of a legacy normal (non-MTC) UE, for multi-UE multiplexing and inter-cell interference. Hereinafter, a BW corresponding to 4 RBs will be referred to as a "mini-SRS (min-SRS) band".

Figure 8:
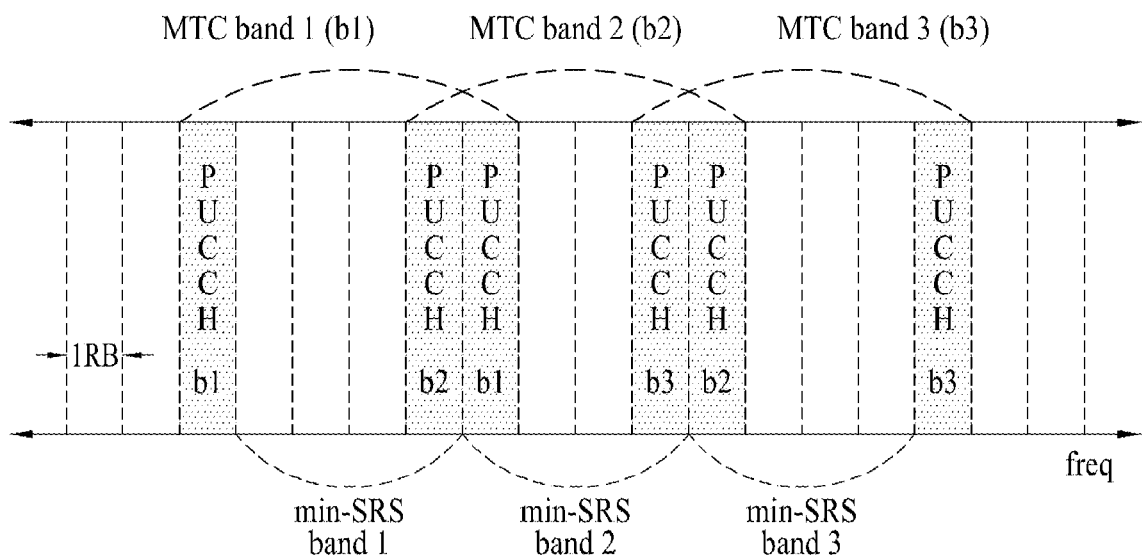
FIGS. 8, 9, and 10 illustrate MTC band allocation according to embodiments of the present invention.
Figure 9:
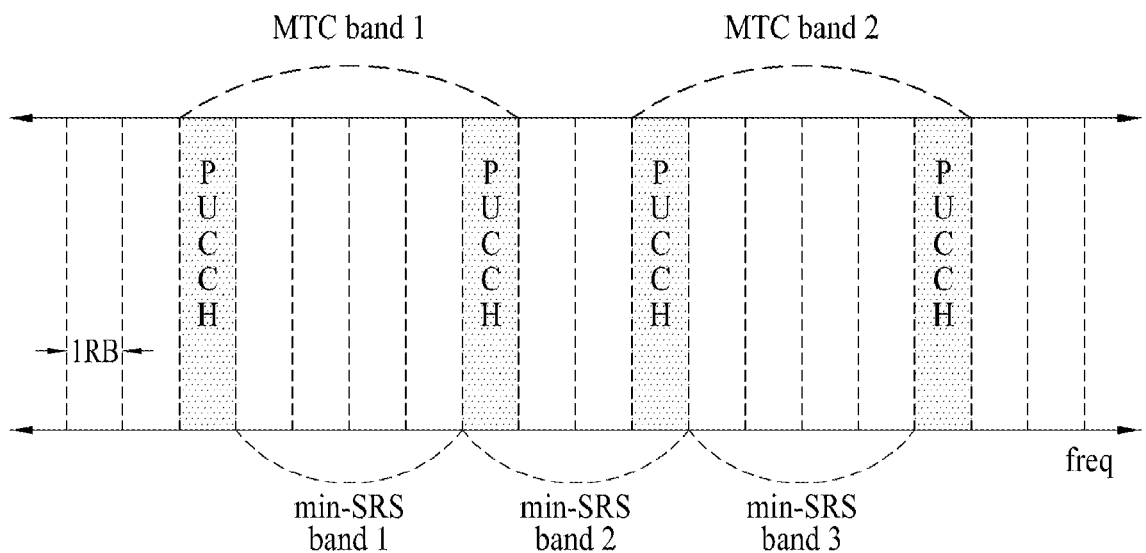
Figure 10:
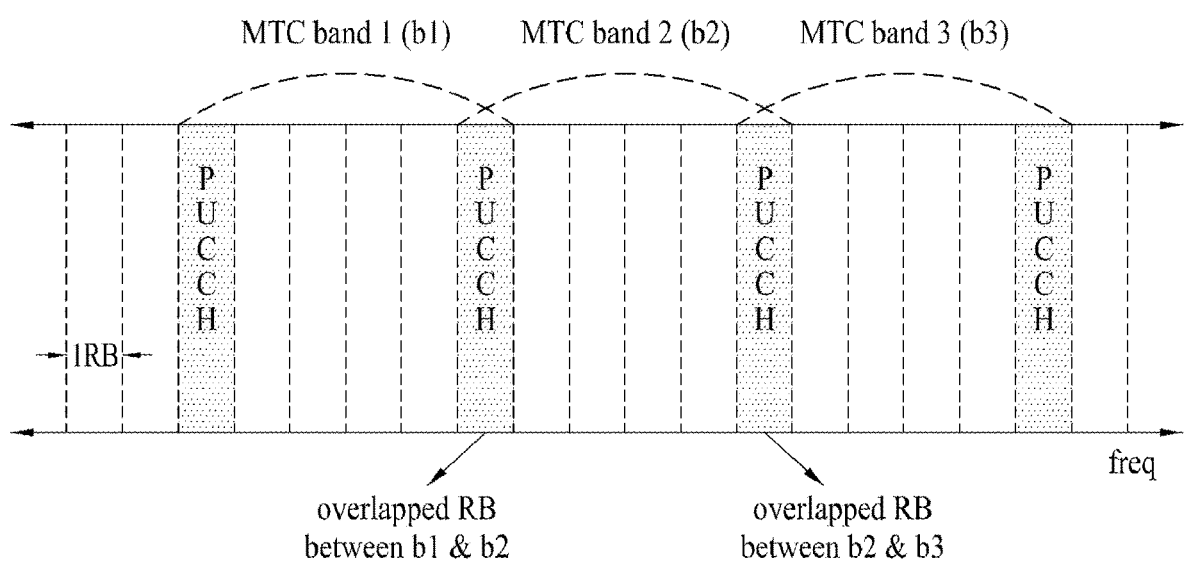

FIG. 8, FIG. 9 and FIG. 10 illustrate MTC band allocation according to embodiments of the present invention.

In consideration of multiplexing transmission between the SRS of the MTC UE and the SRS of the normal UE, each MTC band may be allocated such that one min-SRS band (corresponding to 4 RBs) is located at the center of one MTC band (corresponding to 6 RBs). A PUCCH resource for the MTC UE may be configured in two RBs located at both side edges except for middle four RBs in the MTC band of a total of 6 RBs. That is, an RB of the lowest frequency index and an RB of the highest frequency index among the entire 6 RBs may be used as the PUCCH resource for the MTC UE. In this case, the SRS of the MTC UE operating in each MTC band may be transmitted through a min-SRS band located at the center of each MTC band (with a minimum BW of 4 RBs). Meanwhile, for the MTC band in an entire system BW, 1) referring to FIG. 8, MTC bands each including each of all min-SRS bands in a cell-specific SRS band may be allocated, or 2) referring to FIG. 9, MTC bands each including only an odd-numbered or even-numbered min-SRS band in the cell-specific SRS band may be allocated When each min-SRS band in the cell-specific SRS band corresponds to center 4 RBs of an MTC band, a partial overlapping area is present between neighbor MTC bands as illustrated in FIG. 8 and the number of MTC bands is the same as the number of min-SRS bands in the cell-specific SRS band. When each odd-numbered or even-numbered min-SRS band in the cell-specific SRS band is allocated to an MTC band, an overlapping area is not present between MTC bands as illustrated in FIG. 9 and the number of MTC bands in the cell-specific SRS band is equal to half the number of min-SRS bands in the cell-specific SRS band. In the embodiments of FIGS. 8 and 9, the cell-specific SRS band may be a cell-specific SRS band which is actually configured in a system or a maximum cell-specific SRS band which is configurable in a system BW.

Meanwhile, for actual SRS transmission and/or protection of SRS transmission in an MTC band, a shortened format based PUCCH may be configured for the MTC UE.

As another method for UL MTC band allocation, a PUCCH resource for the MTC UE is configured in two RBs located at both edges in each MTC band, wherein the MTC band may be configured such that two neighbor MTC bands share one RB located at one edge, i.e. one PUCCH resource region. For example, referring to FIG. 10, MTC bands may be configured such that a PUCCH RB located at a right edge in MTC band 1 overlaps a PUCCH RB located at a left edge in MTC band 2. In this case, PUCCH resources (for the MTC UE to which a corresponding band is allocated) corresponding to different MTC bands sharing the same PUCCH RB may be configured to be distinguished between different MTC bands by at least one of a slot number/index, a cyclic shift value, and an OCC in an overlapped PUCCH RB.

As mentioned previously, in principle, a maximum of 18 UEs may be multiplexed in one UL RB. However, since UEs are not multiplexed in an RB used for DL transmission, assuming that a DL MTC band is allocated the same size as a UL MTC band and the UL MTC band includes 6 RBs, a maximum of 6 UEs may be multiplexed in the DL MTC band including 6 RBs. This means that a maximum of 6 PUCCHs associated with DL transmission may occur. As a result, although a maximum of 18 UEs can be multiplexed in the UL PUCCH RB, if the size of the DL MTC band is less than 18 RBs, there is a high possibility that PUCCHs fewer than 18 PUCCHs are multiplexed in the UL PUCCH RB. This may lead to inefficient use of the UL PUCCH RB in terms of MTC communication pursuing low price/low cost. In contrast, according to the embodiment of FIG. 10, since different DL MTC bands corresponding to two UL MTC bands are used for DL reception, the maximum number of UEs used for DL reception in association with the UL PUCCH RB increases and efficiency of the UL PUCCH RB is improved.

Meanwhile, SRS transmission of the MTC UE may also be configured/indicated to be performed even through a UL region outside a corresponding MTC band (based on an entire system BW or a cell-specific SRS band) without restriction only to a UL MTC band. In this case, if SRS transmission through a region outside a given MTC band in a specific subframe is demanded, no UL transmission operation except for SRS transmission may be expected/performed in the specific subframe (and/or a subframe immediately after the specific subframe) for a frequency switching/retuning operation. Similarly, CSI (e.g. CQI/PMI/RI) and/or radio resource management (RRM) measurement (e.g. RSRRP/RSRQ/RSSI measurement) of the MTC UE and feedback/report for CSI and/or RRM may also be configured/indicated to be performed even for a DL region outside a corresponding MTC band (based on an entire system BW) without restriction only to a DL MTC band. In this case, if CSI/RRM measurement for a region outside a given MTC band in a specific subframe is demanded, no DL transmission operation except for signal reception for CSI/RRM measurement may be expected/performed in the specific subframe and a subframe immediately before the specific subframe (and/or a subframe immediately after the specific subframe) for a frequency switching/retuning operation.

On DL, the first symbol duration may be used as a gap for frequency switching/returning when an operation/reception band (for inter-band hopping and inter-band returning) is changed. In this case, for inter-band measurement, scheduling constraint may occur only in a subframe in which the measurement operation is configured/indicated.

In UL, the last symbol duration may be used as a gap for frequency switching/returning when an operation/transmission band (for inter-band hopping etc.) is changed. In this case, SRS transmission configured/indicated on a corresponding symbol may be omitted and a PUCCH/PUSCH in a subframe including the corresponding symbol may not be mapped to the corresponding symbol.

For reference, the RRM is intended to enable the UE and the network to seamlessly manage mobility without significant user intervention by providing the UE with mobility experience, to ensure efficient use of the radio resources, and to provide a mechanism making the eNB satisfy predefined radio resource-related requirements. Main processes performed by the UE to support seamless mobility include cell search, measurement, handover and cell reselection. The eNB may provide measurement configurations applicable to the UE to implement RRM. For example, the eNB may trigger measurement by the UE by transmitting, to the UE, measurement configurations including measurement objects, a reporting configuration, a measurement identity, a quantity configuration, and a measurement gap to ensure RRM. The measurement objects, which are objects on which the UE needs to perform measurement, may include, for example, a single E-UTRA carrier frequency for intra-frequency and inter-frequency measurement, a single UTRA frequency for inter-RAT (Radio Access Technology) UTRA measurement, a set of GERAN carrier frequencies for inter-RAT GERAN measurement, and a set of cell(s) on a single carrier frequency for inter-RAT CDMA2000 measurement. The intra-frequency measurement refers to measurement on the DL carrier frequency(s) of the serving cell(s), the inter-frequency measurement refers to measurement on frequency(s) other than one of the DL carrier frequency(s) of the serving cell(s). The reporting configuration refers to a list of reporting configurations. Each reporting configuration is established with a reporting criterion representing a criterion for triggering the UE to send a measurement report and a reporting format indicating the quantities that the UE needs to include in the measurement report and relevant information. The measurement identity is a list of measurement identities. Each measurement identity links one measurement object to one reporting configuration. By configuring a plurality of measurement identifiers, one or more reporting configurations may be linked to the same measurement object, and one or more measurement objects may be linked to the same reporting configuration. The measurement identities are used as reference numbers in a measurement report. The quantity configuration defines measurement quantities and relevant filtering which are used for all event evaluations and relevant reporting of the type of a corresponding measurement. One filter may be configured for each measurement. The measurement gap indicates a period which the UE can utilize to perform measurement as no UL/DL transmission is scheduled. Once the UE receives the measurement configurations, the UE performs reference signal received power (RSRP) measurement and reference signal received quality (RSRQ) measurement using a CRS on a carrier frequency indicated as a measurement object. The RSRP measurement provides a cell-specific signal strength metric. RSRP measurement is generally used to determine an order of candidate cells (or candidate CCs) according to the signal strength, or is used as an input for determining handover and cell reselection. An RSRP is a linear average of power contribution of REs carrying CRS within a considered frequency bandwidth and defined for a specific cell (or specific CC). Similar to RSRP, RSRQ, which is intended to provide a cell-specific signal quality metric, is mainly used to determine an order of candidate cells (or candidate CCs) according to signal quality. The RSRQ may be used as an input for handover and cell reselection when, for example, the RSRP measurement does not provide sufficient information for performing reliable mobility determination. The RSRQ is defined as "N*RSRP/RSSI", wherein N denotes the number of RBs of the RSSI measurement bandwidth. The received signal strength indicator (RSSI) is defined as all kinds of power including a total received wideband power from all resources including co-channel serving and non-serving cells observed by the UE, adjacent channel interference and thermal noise. Accordingly, the RSRQ may be viewed as indicating a ratio of the pure RS power to the total power received by the UE.

Meanwhile, a narrow BW based MTC UE limitedly has a PDSCH scheduling/transmission resource region only in a DL MTC band. Therefore, it may be efficient that a PUCCH resource/index for HARQ-ACK transmission of the MTC UE be configured to be implicitly linked to each RB resource/index in a DL MTC band (other than a DL control channel resource (e.g. CCE)). For example, the lowest RB index of a PDCCH may be used instead of $n_{CCE}$ in Equation 1 and Equation 2. HARQ-ACK transmission for SPS PDSCH reception may also be performed using an implicit PUCCH resource linked to the RB index without configuring an additional PUCCH resource (through RRC signaling). In this case, a PUCCH resource linked to a specific (e.g. lowest) RB index among (SPS) PDSCH transmission RBs may be used for HARQ-ACK transmission.

In addition, since the MTC UE may intermittently generate DL data traffic or may generate less DL data traffic, CSI feedback may be performed by aperiodic CSI reporting indication (accompanying a PUSCH) by an eNB only at a necessary timing (without PUCCH based periodic CSI reporting configuration). Accordingly, a PUCCH format 2/2a/2b resource (and/or a mixed RB in which the PUCCH format 2/2a/2b resource coexists with a PUCCH format 1/1a/1b resource) may not be configured in a PUCCH region in a UL MTC band. For example, $N_{RB}^{(2)}=0$ and $N_{cs}^{(1)}=0$.

As another method, since the MTC UE may intermittently generate DL data traffic or may generate less DL data traffic, a PUCCH resource for HARQ-ACK transmission corresponding to PDSCH reception may be configured through RAR, Msg4, or (UE-specific) RRC signaling and the PUCCH resource may be commonly used even in the case of an SPS PDSCH. Similarly, in consideration of a UL data traffic characteristic of the MTC UE, a PHICH resource for HARQ-ACK transmission corresponding to a PUSCH (including an SPS) may be configured through RAR/Msg4/RRC signaling.

Figure 11:
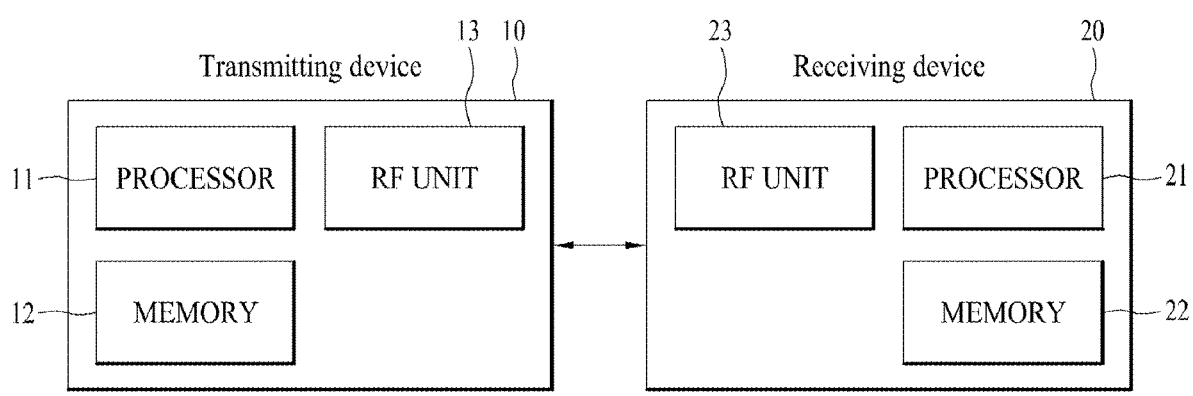
FIG. 11 is a block diagram illustrating elements of a transmitting device 10 and a receiving device 20 for implementing the present invention.

FIG. 11 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may allocate a UL MTC band to the UE according to any one of the embodiments of the present invention. The eNB processor may control the eNB RF unit to transmit, to the UE, information about the MTC band allocated to the UE according to any one of the embodiments of the present invention. The eNB processor may control the eNB RF unit to receive a PRACH transmitted by the UE and control the eNB RF unit to transmit, to the UE, an RAR to the PRACH according to any one of the embodiments of the present invention. The eNB processor may control the eNB RF unit to receive Msg3 based on the RAR and control the eNB RF unit to transmit Msg4 based on Msg3. The eNB processor may control the eNB RF unit to receive a UL signal (e.g. a PUCCH, a PUSCH, and/or an SRS) transmitted by the UE within the MTC band allocated to the UE according to any one of the embodiments of the present invention.

The UE processor may discern a UL MTC band configured for the UE according to any one of the embodiments of the present invention. The UE processor may control the UE RF unit to transmit a PRACH and control the UE RF unit to receive an RAR from the eNB according to any one of the embodiments of the present invention. The UE processor may control the UE RF unit to transmit Msg3 based on RAR. The UE processor may control the UE RF unit to receive Msg4. The UE processor may control the UE RF unit to transmit a UL signal within an MTC band allocated to the UE according to any one of the embodiments of the present invention.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The embodiments of the present invention are applicable to a BS, a UE, or other devices in a wireless communication system.

The invention claimed is:

1. A user equipment operating in a coverage enhancement mode in a wireless communication system, the user equipment comprising:
    a transceiver,
    at least one processor; and
    at least one computer memory that is operably connectable to the at least one processor and that has stored thereon instructions which, when executed, cause the at least one processor to perform operations comprising:
    transmitting, via the transceiver, a random access preamble on an uplink system band;
    receiving, via the transceiver, a random access response related to the random access preamble; and
    transmitting, via the transceiver, a first physical uplink shared channel (PUSCH) for carrying Msg3 based on the random access response,
    wherein the uplink system band comprises a plurality of uplink frequency bands in a frequency domain,
    wherein each of the plurality of uplink frequency bands includes only a predetermined number of consecutive resource blocks in the frequency domain,
    wherein the random access response includes frequency resource information for the first PUSCH,
    wherein the frequency resource information includes i) frequency band allocation information that designates an uplink frequency band from among the plurality of uplink frequency bands included in the uplink system band, and ii) resource allocation information that designates at least one resource block from among resource blocks included in the designated uplink frequency band, and
    wherein the first PUSCH is transmitted on the at least one resource block in the designated uplink frequency band.

2. The user equipment according to claim 1, wherein the predetermined number is 6.

3. The user equipment according to claim 1, wherein the number of resource blocks included in the uplink system band is greater than the predetermined number.

4. The user equipment according to claim 1, wherein the random access response further includes information regarding a downlink frequency band from among a plurality of downlink frequency bands included in a downlink system band related to the uplink system band,
    wherein each of the plurality of downlink frequency bands includes only 6 consecutive resource blocks in the frequency domain, and
    wherein the operations further comprise:
    receiving, via the transceiver, a downlink channel on a downlink frequency band.

5. The user equipment according to claim 1, wherein the operations further comprise:
    transmitting, via the transceiver, a physical uplink control channel (PUCCH) in the designated uplink frequency band,
    wherein the PUCCH is transmitted on the lowest resource block and the highest resource block among resource blocks included in the designated uplink frequency band.

6. An apparatus for a user equipment operating in a coverage enhancement mode in a wireless communication system, the apparatus comprising:
    at least one processor; and
    at least one computer memory that is operably connectable to the at least one processor and that has stored thereon instructions which; when executed, cause the at least one processor to perform operations comprising:
    transmitting a random access preamble on an uplink system band;
    receiving a random access response related to the random access preamble; and
    transmitting a first physical uplink shared channel (PUSCH) for carrying Msg3 based on the random access response,
    wherein the uplink system band comprises a plurality of uplink frequency bands in a frequency domain,
    wherein each of the plurality of uplink frequency bands includes only a predetermined number of consecutive resource blocks in the frequency domain,
    wherein the random access response includes frequency resource information for the first PUSCH,
    wherein the frequency resource information includes i) frequency band allocation information that designates an uplink frequency band from among the plurality of uplink frequency bands included in the uplink system band, and ii) resource allocation information that designates at least one resource block from among resource blocks included in the designated uplink frequency band, and
    wherein the first PUSCH is transmitted on the at least one resource block in the designated uplink frequency band.

7. The apparatus according to claim 6, wherein the predetermined number is 6.

8. The apparatus according to claim 6, wherein the number of resource blocks included in the uplink system band is greater than the predetermined number.

9. The apparatus according to claim 6, wherein the random access response further includes information regarding a downlink frequency band from among a plurality of downlink frequency bands included in a downlink system band related to the uplink system band, wherein each of the plurality of downlink frequency bands includes only 6 consecutive resource blocks in the frequency domain, and wherein the operations further comprise:

receiving a downlink channel on a downlink frequency band.

10. The apparatus according to claim 6, wherein the operations further comprise:

transmitting a physical uplink control channel (PUCCH) in the designated uplink frequency band, wherein the PUCCH is transmitted on the lowest resource block and the highest resource block among resource blocks included in the designated uplink frequency band.

11. A non-transitory computer-readable storage medium encoded with at least one computer program comprising instructions that, when executed by at least one processor, perform operations for a user equipment in a coverage enhancement mode to transmit an uplink channel in a wireless communication system, the operations comprising:

transmitting a random access preamble on an uplink system band;

receiving a random access response related to the random access preamble; and transmitting a first physical uplink shared channel (PUSCH) for carrying Msg3 based on the random access response, wherein the uplink system band comprises a plurality of uplink frequency bands in a frequency domain, wherein each of the plurality of uplink frequency bands includes only a predetermined number of consecutive resource blocks in the frequency domain, wherein the random access response includes frequency resource information for the first PUSCH, wherein the frequency resource information includes i) frequency band allocation information that designates an uplink frequency band from among the plurality of uplink frequency bands included in the uplink system band, and resource allocation information that designates at least one resource block from among resource blocks included in the designated uplink frequency band, and wherein the first PUSCH is transmitted on the at least one resource block in the designated uplink frequency band.

12. The non-transitory computer-readable storage medium according to claim 11, wherein the predetermined number is 6.

13. The non-transitory computer-readable storage medium according to claim 11, wherein the number of resource blocks included in the uplink system band is greater than the predetermined number.

14. The non-transitory computer-readable storage medium according to claim 11, wherein the random access response further includes information regarding a downlink frequency band from among a plurality of downlink frequency bands included in a downlink system band related to the uplink system band, wherein each of the plurality of downlink frequency bands includes only 6 consecutive resource blocks in the frequency domain, and wherein the operations further comprise:

receiving a downlink channel on a downlink frequency band.

15. The non-transitory computer-readable storage medium according to claim 11, wherein the operations further comprise:

transmitting a physical uplink control channel (PUCCH) in the designated uplink frequency band, wherein the PUCCH is transmitted on the lowest resource block and the highest resource block among resource blocks included in the designated uplink frequency band.

\* \* \* \* \*